July 7, 1931.    A. R. LAWRENCE    1,813,859
CORRUGATED SHELL AND METHOD OF MAKING THE SAME
Filed July 13, 1929
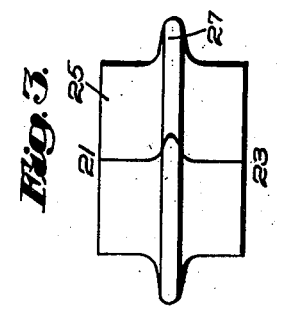
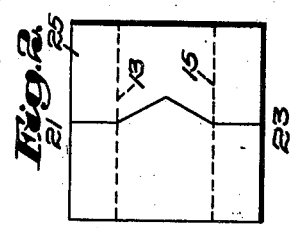
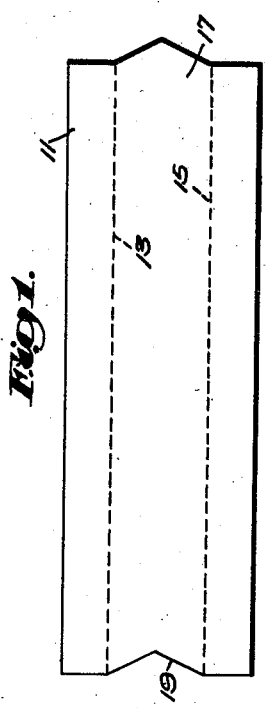
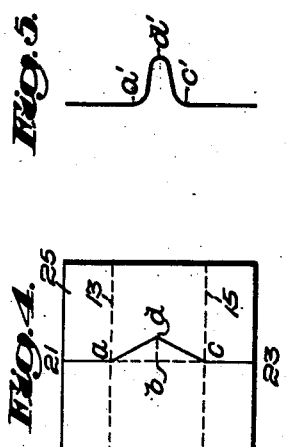
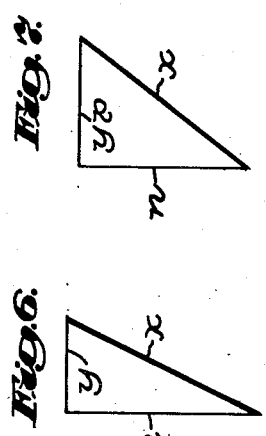
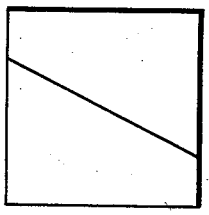
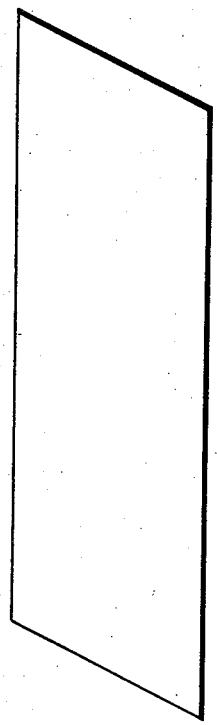

Patented July 7, 1931

1,813,859

UNITED STATES PATENT OFFICE

ALMON R. LAWRENCE, OF ARLINGTON, MASSACHUSETTS, ASSIGNOR TO E. B. BADGER & SONS COMPANY, OF BOSTON, MASSACHUSETTS, A CORPORATION OF MASSACHUSETTS

CORRUGATED SHELL AND METHOD OF MAKING THE SAME

Application filed July 13, 1929. Serial No. 378,013.

This invention relates to corrugated shells and methods of making the same. It has often been found impracticable to shape or form corrugations from seamless cylindrical tubes, particularly where heavy duty is required, as in the case of expansion joints for pipe mains. This is particularly the case where it is attempted to form such corrugated tubes from ferrous metal, such, for example, as some of the chrome nickel steel alloys.

This is due in large part to the initial difficulty of forming a suitable cylindrical tube so that it possesses uniform thickness and a uniform distribution of the stresses in the metal. Such tubes are commonly formed by a succession of drawing actions with interposed steps of annealing, and this method of manufacture tends to increase the thickness of the metal at certain points in the tube while reducing it at other points, and also tends to set up unlike strains in different parts of the cylinder which are not readily normalized and which disadvantageously affect the flexibility and the life of a corrugated tube shaped from a cylindrical tube formed in this manner.

It is therefore often desirable, particularly in the use of ferrous metal, to form a corrugated tube from a seamed cylindrical tube, the latter welded into tubular form from a sheet, which latter may be readily obtainable of substantially uniform thickness and distribution of metal and with strains substantially normalized.

The welding of such a sheet, however, introduces serious complications in the finally formed corrugated tube. In the process of forming corrugations in a cylindrical metal tube, the longitudinal elements of the cylinder where they cross the corrugations undergo a shrinkage or shortening. On the other hand, the circumferential elements of the tube lying in the raised portions of the corrugations are stretched or lengthened, the amount of the shrinkage of the longitudinal elements and the amount of the stretching of the circumferential elements depending on the size, height and shape of the corrugations, and the character of the metal.

Accordingly, if a cylindrical tube be formed from a sheet having its edges welded along a longitudinal seam parallel to the axis of the cylindrical tube, when such tube is subjected to the forming operation designed to produce the corrugation, the welded seam, extending as it does lengthwise the tube and crossing the corrugations at substantially right angles, is subjected at each corrugation to a very heavy tension acting at right angles thereto, tending to rupture the seam, and is also subjected to a compression stress acting lengthwise the seam. This imparts to the corrugated tube an element of weakness localized in the corrugations, which, in the case of corrugated tubes subjected to heavy duty, as in the case of expansion joints, shortens the life of the tube as well as renders more difficult the process of forming the corrugation and avoiding the manufacture of many defective tubes.

I have found that the sheet from which the seamed cylindrical welded tube is formed may be cut at such an angle that the welded seam resulting therefrom can be made to lie across the corrugations in a neutral position, such that, in the process of forming the corrugations, the seam will undergo substantially no shrinkage nor stretching, and such that, if the seam in the flat sheet be positioned to conform to the selected angle, both the tension and the compression stresses in such seam, which would otherwise result from the forming process, are entirely relieved, and a corrugated joint may be formed from a seam-welded tube having unusual strength and durability.

The invention will be best undertood by reference to the following description when taken in connection with the accompanying illustration showing one or more specific embodiments thereof, while its scope will be more particularly pointed out in the appended claims.

In the drawings:—

Fig. 1 shows a flat sheet of metal cut into such shape that, when formed into a cylindrical tube, it will provide the desired locus of the welded seam suitable for forming a single corrugation;

Fig. 2 shows the shape of the cylindrical welded tube before forming the corrugation;

Fig. 3 shows the shape of the tube after the corrugation has been formed;

Figs. 4, 5, 6 and 7 are diagrams used to assist in explaining the principle;

Fig. 8 shows another form of sheet cut according to the same general principle but of simplified pattern;

Fig. 9 shows the shape of the tube formed from the sheet illustrated in Fig. 8 after welding and before forming the corrugation; and Fig. 10 shows the shape of the corrugated tube formed from the cylindrical tube illustrated in Fig. 9 after the corrugation has been formed.

Referring to the drawings, and first more particularly to the embodiment of the invention illustrated in Figs. 1, 2 and 3, I have there illustrated the several steps of forming a corrugated tube embodying a single corrugation. The same principle may be applied to a tube having any number of corrugations.

In making the tube a flat metallic sheet 11 is taken, this being of any suitable thickness and of any desired metal. The latter may be of copper or of ferrous metal, such, for example, as one of the chrome nickel steel alloys, or of any other desired metal. At the point where the corrugation is to be formed in a cylindrical tube, as, for example, in the area of the sheet falling between the lines 13 and 15, the sheet is cut on one side to provide a projecting triangular portion 17 and at the opposite side to provide a mating triangular indentation 19.

The sheet 11 is then rolled into tubular form and the opposite edges welded together, the triangular projection 17 fitting into the mating indentation 19, and there being formed a welded seam 21—23 which crosses in a zig-zag path the portion 13—15 of the cylindrical tube 25 in which the corrugation is to be formed.

The cylindrical tube formed in this manner is then subjected to a process for forming a corrugation 27 (Fig. 3) which is raised from that portion of the cylindrical tube lying between the lines 13—15 (Fig. 2). Any suitable process for forming the corrugation may be employed, as, for example, that whereby the tube, encircled by relatively movable corrugated die or mold sections, is subjected at the same time to end pressure longitudinally and to internal fluid pressure, causing the tube to assume the conformation described by the internal formation of the outside die or mold sections.

In the process of formation, the metal of the cylindrical tube 25 lying within the area 13—15 becomes foreshortened or contracted longitudinally and at the same time stretched or expanded circumferentially. The amount of the contraction longitudinally and the amount of the expansion circumferentially for a corrugation of any given dimensions can be readily ascertained experimentally in advance for a cylindrical tube of any given dimensions, and from this data there may be determined the angle at which the welded seam should cross the area 13—15 to be corrugated to provide a seam which will be subjected to neither stretching nor contraction during the process of forming the corrugation.

This will be clear from the diagrams shown in Figs. 4 to 7 inclusive. Fig. 4 represents a development in plan of the cylindrical welded tube 25. In the process of forming a corrugation, such as represented by $a'\ d'\ c'$ in Fig. 5, the element $a\ b$ or $b\ c$ lying in the area from which the corrugation is to be formed undergoes a shortening or contraction from its original length, which may be represented by $m$, to a lesser length which may be represented by $n$. A circumferential element, such as $b\ d$, lying at the crest of the corrugation to be formed undergoes a stretching or expansion from its original length, which may be represented by $y$, to a greater length circumferentially, which may be expressed by $y\ p$. With these factors of contraction and extension, which may be readily ascertained by trial, a length of seam $a\ d$ or $c\ d$, extending from the point where the corrugation starts in the cylindrical body of the tube to the crest of the corrugation, may be determined, which length will be the same both before and after the formation process, and from this the angle at which the blank should be cut thereby ascertained.

If $m$ be taken as the length of the element $a\ b$ in the cylindrical tube 25 before forming the corrugation, and $y$ the length of the element $b\ d$, the length and angle of the cut $c\ d$ to be made will be represented by the hypotenuse $x$ of the triangle (Fig. 6). In Fig. 7 a similar triangle may be constructed having the hypotenuse $x$ of the same length as the triangle in Fig. 6, one side of the triangle being represented by $y\ p$ (the length to which the circumferential element $b\ d$ is to be stretched) and the other side by $n$ (the length of the longitudinal element $a\ b$ after its contraction). It is only necessary to ascertain such a value of $y$ as will provide the same value for $x$ in both triangles to determine the angle of cut which will provide the same length of seam after the formation of the corrugation as before. In Fig. 6, $x^2 = m^2$ plus $y^2$. In Fig. 7, $x^2 = n^2$ plus $y^2\ p^2$. These equations may be readily solved for the value of $y$, definitely fixing the length and angle of the side $x$ in the triangle of Fig. 6 which provides the pattern on which the blank should be cut to provide the appropriately located seam portions $a\ d$ and $c\ d$.

To take a specific example, in forming a corrugated joint of a certain steel alloy having a single corrugation in a tube 10 inches in diameter where the corrugation is of a certain shape and 2¼ inches deep, it has been found that the element $a\ c$ contracts from a length of substantially 6 inches to a length approximately 5¼ inches, that is to say, it requires 6 inches of the cylindrical tube to form the corrugation, the shrinkage being approximately 22½%. Similarly, it has been found that the extreme outside diameter of such a finished corrugated tube will be approximately 14½ inches, or that the circumferential element at the crest of the corrugation has been stretched by approximately 45%. In the illustrative example, the above equation becomes $3^2$ plus $y^2 = (2.625)^2$ plus $(1.45\ y)^2$, giving as a value for $y$ approximately 1.38 inches, from which the blank can be laid out and cut as represented in Fig. 1.

If the tube is to be formed with a plurality of similar corrugations, the blank will be cut to provide a seam crossing each corrugation in the same angular relationship.

Since it is primarily essential only that the welded seam should cross the portion of the tube in which the corrugation is formed at such an angle that it is substantially relieved of the stresses due to the stretching and contraction of the tube, it is not essential that the line of cut should follow the pattern represented in Fig. 1 where it extends parallel to the axis of the tube lengthwise the tube outside the corrugated area and is inclined toward an apex within the corrugated area, crossing the corrugation in a zig-zag path.

A similar result may be had, so far as increasing the strength and durability of the corrugated portions of the tube are concerned, by cutting each opposite edge of the blank in a straight line, as represented in Fig. 8, where the edges are cut in parallel lines inclined to the ends of the blank but at the angle which has been determined according to the foregoing explanation. This results in a seam running along a helical path about the tube but provides a locus for the seam where it crosses the corrugation in which substantially no stretching nor contraction takes place during its formation.

It will be seen that in addition to locating the seam at a neutral point in the corrugation, so far as the opposing stresses of compression and tension are concerned, these methods of making a corrugated joint provide an increased length of seam, such that the unit of stress per unit of length is lessened, or, in other words, the stress per unit length of tube is distributed over a greater length of seam.

Although several specific embodiments of the invention have been described with great particularity in detail, it is to be understood that the invention is not restricted to the particular embodiments of the invention herein disclosed or to the detailed steps by which the process is carried out, or to any particular metal from which the tube is formed. Various modifications thereof in detail and in the arrangement of parts may be made by those skilled in the art without departing from the invention as defined in the following claims.

Claims:

1. The method of forming a corrugated shell which consists in constructing a seam-welded tube from a sheet metal blank, and corrugating the tube, the blank having been cut at such a predetermined angle to the longitudinal axis of the blank as to position that part of the seam in the area to be corrugated in a substantially neutral position with respect to elongation and contraction.

2. The method of forming a corrugated shell which consists in forming a seam-welded tube from a blank of sheet metal, and corrugating the tube, the seam edges of the blank in the area to be corrugated having been cut along such a pattern that the seam in forming the corrugation is substantially unchanged in length.

3. The method of constructing a corrugated shell from a seam-welded cylindrical tube which consists in determining from the longitudinal contraction and the circumferential elongation of the metal in the tube to be corrugated a substantially neutral position for such seam in respect to elongation and contraction, cutting a sheet metal blank according to such determination, seam welding the same to form a cylindrical tube, and forming a corrugation therein.

4. The method of forming a shaped metallic shell which consists in constructing a seam-welded tube from a sheet metal blank, and then shaping certain portions of the tube, after first cutting the blank, to position that part of the seam in the area to be shaped in a substantially neutral position with respect to elongation and contraction incidental to the shaping process.

5. A seam-welded corrugated metal shell having a seam lying within the corrugated area and crossing the corrugation in a position off-set from a longitudinal element of the shell, the blank from which the shell was made having been cut in the area to be corrugated at such an angle to the longitudinal axis of the blank that the seam is located in a substantially neutral position with respect to contraction and elongation of the metal of the blank.

6. A seam-welded corrugated tube, the seam edges of the blank from which the tube was made having been cut within the area to be corrugated along such a pattern that the corrugated welded seam has substantially the same length that it had before corrugation.

7. The method of forming a seam-welded corrugated shell from a blank, which comprises cutting the seam-edges of the blank in the area to be corrugated along such a pattern that the seam in forming a predetermined corrugation will remain substantially unchanged in length, seam-welding said edges to form a tube and forming said predetermined corrugation in said area.

8. A seam-welded corrugated metal shell having a substantially unstrained seam, produced from a blank having its seam edges cut along such a pattern at the area of corrugation that the seam is substantially the same length after corrugation as it was before corrugation.

In testimony whereof, I have signed my name to this specification.

ALMON R. LAWRENCE.